United States Patent
Nuzzio

(10) Patent No.: US 10,330,506 B2
(45) Date of Patent: Jun. 25, 2019

(54) WEB-BASED MULTI-SENSOR/INSTRUMENT CONTROL SYSTEM

(71) Applicant: Analytical Instruments Systems, Inc., Ringoes, NJ (US)

(72) Inventor: Donald Bernard Nuzzio, Ringoes, NJ (US)

(73) Assignee: Analytical Instrument Systems, Inc., Ringoes, NJ (US)

( * ) Notice: Subject to any disclaimer, the term of this patent is extended or adjusted under 35 U.S.C. 154(b) by 921 days.

(21) Appl. No.: 14/378,624

(22) PCT Filed: Feb. 13, 2013

(86) PCT No.: PCT/US2013/026003
§ 371 (c)(1),
(2) Date: Aug. 13, 2014

(87) PCT Pub. No.: WO2013/130268
PCT Pub. Date: Sep. 6, 2013

(65) Prior Publication Data
US 2014/0372069 A1 Dec. 18, 2014

Related U.S. Application Data

(60) Provisional application No. 61/598,535, filed on Feb. 14, 2012, provisional application No. 61/599,899, filed on Feb. 16, 2012.

(51) Int. Cl.
*G05D 21/02* (2006.01)
*G01D 21/00* (2006.01)
(Continued)

(52) U.S. Cl.
CPC .......... *G01D 21/00* (2013.01); *G05B 19/042* (2013.01); *G05D 21/02* (2013.01); *G06F 11/00* (2013.01);
(Continued)

(58) Field of Classification Search
CPC ....... G01D 21/00; G05D 19/042; G05D 21/02
(Continued)

(56) References Cited

U.S. PATENT DOCUMENTS 6,266,390 B1 * 7/2001 Sommer, Jr. .......... B07C 5/3427
378/45
2002/0065872 A1 * 5/2002 Genske ................. G06F 9/4411
709/202

(Continued)

OTHER PUBLICATIONS

Getting Stated Building Applications with RL-ARM; Copy7right @ 1997-2009 ARM Ltd and ARM Germany GmbH.*

*Primary Examiner* — Long K Tran
(74) *Attorney, Agent, or Firm* — Rohm & Monsanto, PLC

(57) ABSTRACT

A system for monitoring and controlling electrical devices has a local central processor with memory for storing an operating and control systems for controlling analog or digital sensors, instruments, and devices. A web browser interfaces with a communications system to exchange data with the local central processor. External hardware couples to the local central processor via an inter integrated circuit interconnection system. Plural sensors and instruments couple to the local central processor, and are controlled over the internet. Electrical devices include any combination of temperature sensors, potentiometric sensors, oceanographic sensors and instruments, industrial sensors and instruments, voltammetric sensors, light sensors, atmospheric sensors and instruments, water sensors, pH sensors, and amperometric sensors and instruments. Sensor data is stored in a removable data storage arrangement.

18 Claims, 6 Drawing Sheets

(51) Int. Cl.
  *G06F 11/00* (2006.01)
  *G05B 19/042* (2006.01)
  *H04L 29/08* (2006.01)
  *H04W 4/38* (2018.01)
  *G06F 11/30* (2006.01)

(52) U.S. Cl.
  CPC ...... *H04L 29/08081* (2013.01); *H04L 67/025* (2013.01); *H04L 67/12* (2013.01); *H04W 4/38* (2018.02); *G05B 2219/32126* (2013.01); *G06F 11/3006* (2013.01); *G06F 11/3058* (2013.01); *G06F 11/3089* (2013.01)

(58) Field of Classification Search
  USPC ..................................... 702/1, 127, 287, 188
  See application file for complete search history.

(56) References Cited

U.S. PATENT DOCUMENTS

| | | | | |
|---|---|---|---|---|
| 2002/0081501 | A1* | 6/2002 | Hasegawa | G03F 1/56 430/5 |
| 2002/0181501 | A1* | 12/2002 | Nova | G08B 25/10 370/467 |
| 2003/0014149 | A1* | 1/2003 | Kreidler | G05B 19/042 700/169 |
| 2005/0066711 | A1* | 3/2005 | Discenzo | G01N 33/2888 73/64.56 |

* cited by examiner

WEB-BASED MULTI-SENSOR/INSTRUMENT CONTROL SYSTEM

RELATIONSHIP TO OTHER APPLICATION

This application claims the benefit of the filing date of U.S. Provisional Patent Application Ser. No. 61/598,535, filed Feb. 14, 2012, and 61/599,899, filed Feb. 16, 2012. The disclosures in these provisional patent applications are incorporated herein by reference, in their entirety, for all purposes.

BACKGROUND OF THE INVENTION

Field of the Invention

This invention relates generally to sensor monitoring, data acquisition, instrument control, and storage systems, and more particularly, to a system wherein analog and digital sensors and experiments performed thereby are controlled remotely via a network, and the resulting data is stored within the instrument and can be acquired at one or more remote servers, as well as data stored at the sensors themselves.

Description of the Related Art

There exist systems in the prior art for transferring data files over the internet. In some such systems, the acquired data file is presented on a web page, or transmitted by e-mail. These known systems, however, offer little or no control over experiments being conducted by the known systems. In addition, the prior art illustrates components of a distributed network environment. This known type of system, however, is separated, whereby the web server is separate from control and analysis units. There is a need for integrated control, analysis, and network communication in a central system. There is additionally a need for a system wherein a plurality of the afore-mentioned functions are integrated into one central processing unit, including a web server.

In copending Ser. No. 12/733,518 to the same applicant as herein, which is a national stage filing of PCT/US08/10409 that was filed Sep. 5, 2008, Applicant described sensor and data logging systems for acquiring data from sensors having associated stored parametric and calibration information. In that disclosure, which is incorporated herein in its entirety by reference, there was disclosed a microprocessor having a sensor input for receiving data from a sensor, a memory access port for communicating with a memory system, and an output port for issuing data. A plurality of sensors were also disclosed, each producing associated sensor signals responsive to respective characteristics of an environment, the sensor signals being propagated to a sensor input of a microprocessor. There was additionally disclosed a memory system coupled to a memory access port of the microprocessor for storing calibration data associated with the plurality of sensors. Additionally, a communications arrangement was disclosed as coupled to the output port of the microprocessor. This now known arrangement did not disclose a system of controlling sensors or instruments from a remote location, or the use of the world wide web via an internet browser to effect such control.

It is, therefore, an object of this invention to provide a sensor/instrument control system that can perform integrated control, analysis, and network communication in a central system.

It is another object of this invention to provide a sensor/instrument control system wherein integrated control, analysis, and network communication can be performed selectably in a central processing unit and in a web server.

It is also an object of this invention to provide a multi-sensor arrangement that will enable control over a variety of sensor parameters and functions, wherein the sensors are any combination of analog or digital devices.

It is a further object of this invention to provide a remote sensor control system that enables monitoring of the sensors over a network.

It is additionally an object of this invention to provide a remote electrochemistry sensor control system that enables monitoring of the sensors over the world wide web.

It is yet a further object of this invention to provide a sensor/instrument control system that permits real-time data streaming from the instrument to any server.

It is also another object of this invention to provide a sensor/instrument control system that permits real-time data storage from the instrument to any server.

It is yet an additional object of this invention to provide an integrated instrument world wide web control system that enables instrument control, sensor calibration, and data collection of raw data or calibrated data from on-board storage over an integrated networking facility.

It is still another object of this invention to provide a remote sensor/instrument control system that enables monitoring of the sensors and analytical instruments over a network.

It is a yet further object of this invention to provide a remote electrochemistry sensor control system having a spectroscopy sensor control system that enables monitoring of the spectroscopy sensors over the world wide web.

It is a yet further object of this invention to provide a remote chromatography control system.

It is also a further object of this invention to provide an integrated data collection system with web serving capability, from remote sensors.

It is additionally another object of this invention to provide data collection from remote instruments.

A still further object of this invention is to provide control of sensors from a remote web based computer.

An additional object of this invention is to provide remotely accessible data storage on board of an instrument.

It is a yet further object of this invention to provide control of new smart sensors.

It is also a further object of this invention to provide deposition of calibration tables for that sensor in the sensor electronics itself, rendering it to be smart.

It is additionally another object of this invention to provide access to a smart sensor from the web.

A still further object of this invention is to provide set point and limits (high and low) for every sensor that can communicate via the web or email.

An additional object of this invention is to provide alerts of sensor irregularities recorded by the sensor/instrument electronics to be communicated automatically via the web or email.

Yet another object of this invention is to provide multiple sensors or instruments that are controllable simultaneously.

SUMMARY OF THE INVENTION

The foregoing and other objects are achieved by this invention which provides a system for monitoring and controlling electrical devices. In accordance with the invention, the system is provided with a local central processor having a first memory region for storing an operating system and a second memory region for storing a control system for controlling the electrical devices. A web browser system interfaces with a communications system for conducting data between the local central processor and the web browser system. The communications system employs any combination of wired, radio, electromagnetic, acoustic, fiber optic, and any other known data transmission arrangements.

In one embodiment, the local central processor is an ARM processor, and the operating system is a Keil RTX operating system.

In a further embodiment, there is provided an electrochemical controller coupled to the local central processor. The local central processor is further provided with a third memory region for storing control drivers for the electrochemical controller. In advantageous embodiments, the electrochemical controller is a model DLK-70 controller or a DLK WOMO-1 with web-micro observatory offered commercially by Analytical Instrument Systems, Inc.

In a further embodiment, there is provided external hardware coupled to the local central processor. The external hardware is coupled to the local central processor via an inter integrated circuit interconnection system.

In another embodiment, there is further provided a plurality of sensors coupled to the local central processor. The plurality of electrical devices include any combination of temperature sensors, potentiometric sensors, oceanographic sensors, industrial sensors, voltammetric sensors, light sensors, atmospheric sensors, water sensors, pH sensors, and amperometric sensors, as well as any combination of digital instruments, including instruments that are serially controlled via RS-232, RS-422, RS-485, and similar control channels. At least one sensor of the plurality of sensors issues sensor data that is stored in a removable data storage arrangement. Advantageously, in some embodiments, the removable data storage arrangement is a remote removable data storage arrangement. In a further embodiment, at least one sensor of the plurality of sensors is provided with a memory for storing data generated by the associated sensor. In yet another embodiment, at least one sensor of the plurality of sensors is provided with a microprocessor.

In a further embodiment, the plurality of electrical devices includes at least one instrument coupled to the local central processor. The instrument is provided, in some embodiments, with a memory for storing instrument data generated by the instrument. In some embodiments, the memory is removable. The instrument issues instrument data that is stored, in some embodiments, in a remote data storage arrangement. The remote data storage arrangement is removable in some embodiments. The instrument includes any combination of an electrochemical instrument, a spectroscopy instrument, a chromatographic instrument, and any other suitable instrument. The plurality of electrical devices includes, in some embodiments, a plurality of instruments.

In accordance with a method aspect of the invention, there is provided method of coordinating data from a plurality of remote devices. The method includes the steps of:

using a web browser to issue control data to the plurality of remote devices; and receiving via the web browser experimental data produced by the plurality of remote devices.

In one embodiment of this method aspect of the invention, there is provided the further step of storing calibration data associated with respective ones of the plurality of remote devices. In a further embodiment there is provided the step of propagating experiment timing data via the internet to selected ones of the plurality of remote devices, and in yet further embodiments, there is provided the further step of propagating the experimental data to a microprocessor.

There is provided the further step of producing at an output of the microprocessor output data that is responsive to the experimental data.

In another embodiment the plurality of remote devices includes at least one sensor. The at least one sensor is a selectable one of a temperature sensor, a voltammetric sensor, an atmospheric sensor, an industrial sensor, an amperometric sensor, a pH sensor, a light sensor, a water sensor, and a potentiometric sensor.

In some embodiments, the plurality of remote devices includes at least one instrument, the at least one instrument being a selectable one of an electrochemical instrument, a spectroscopy instrument, and a chromatographic instrument. At least one of the remote devices, in some embodiments, is provided with a local memory.

In further embodiments, a microprocessor is provided at a remote device, there is provided the further step of performing a calibration function directly at the remote device. Additionally, in other embodiments, a mathematical function is performed at the remote device.

BRIEF DESCRIPTION OF THE DRAWING

Comprehension of the invention is facilitated by reading the following detailed description, in conjunction with the annexed drawing, in which.

DETAILED DESCRIPTION

Figure 1:
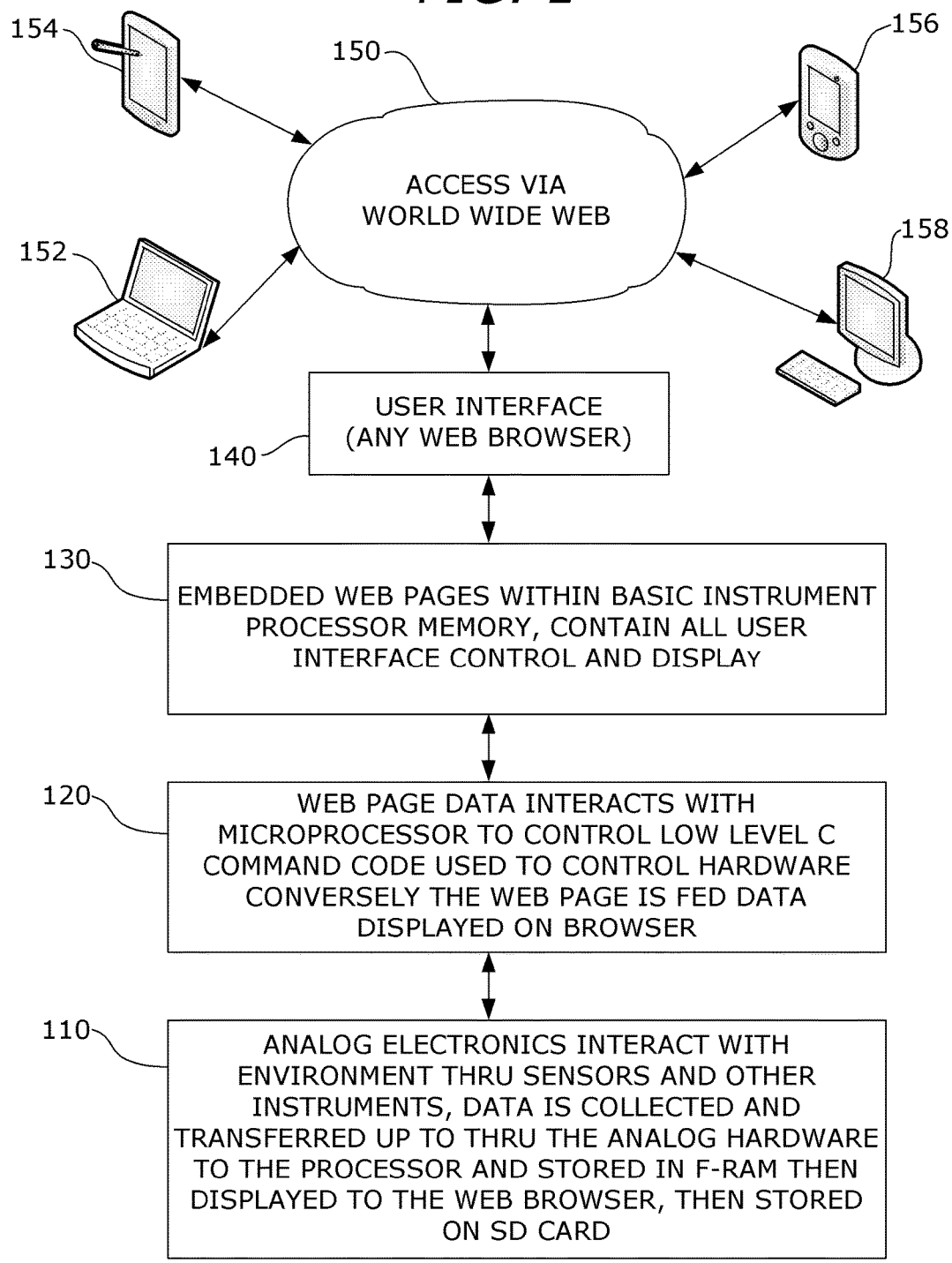
FIG. 1 is a simplified schematic overview representation of a specific illustrative embodiment of the invention.

FIG. 1 is a simplified schematic overview representation of a specific illustrative embodiment of the invention, configured as a web accessible sensor monitoring system 100. As shown in this figure, analog electronics 110 interact with the environment (not shown) through sensors and other instruments (not shown in this figure). Data is collected and transferred up to the analog hardware to a processor (not shown in this figure) and stored in an F-RAM (not shown in this figure). The data is then propagated to a web browser 140, and in a specific illustrative embodiment of the invention, it is stored on a SD card (not shown in this figure). The propagation of the data is effected via any combination of wired, radio, electromagnetic, acoustic, fiber optic, and any other known data transmission arrangements.

At a function block 120, web page data (not shown) interacts with a microprocessor (not shown in this figure) to control low level C command code that is used to control the sensors and other instruments referenced above in relation to analog electronics 110. In addition, web page 130 is supplied data that is displayed on web browser 140. The data on web browser 140 is accessible in this embodiment over world wide web 150 via any appropriate system that can access the world wide web, such as a laptop computer 152, a personal digital assistant 154, a tablet 156, a personal computer 158, a smart mobile telephone (not shown), etc.

In this manner, the system of the present invention is useful to control experiments remotely, illustratively using the internet, and also to acquire the resulting experimental data. This system, therefore, will trigger from a remote location any combination of sensors and instruments into operation at desired times, including simultaneously, to effect the desired experimental protocol, and will acquire the data that constitutes the experimental results. The experiment protocol and the resulting data are presented on a display, as hereinabove described, thereby facilitating overall control of the system, including the viewing of data, the setting of the system time, the calibration of various system parameters, the initiation and control of an experiment, the analysis of the resulting information, etc. In addition, the experiment can be made responsive to the data, such as, for example, controlling the operation of one or more instruments in response to the data values obtained from one or more sensors.

It is to be noted that sensor monitoring system 100, analog electronics 110, function block 120, and web page 130 are all integrated in this specific illustrative embodiment of the invention into one compact processing system.

Figure 2:
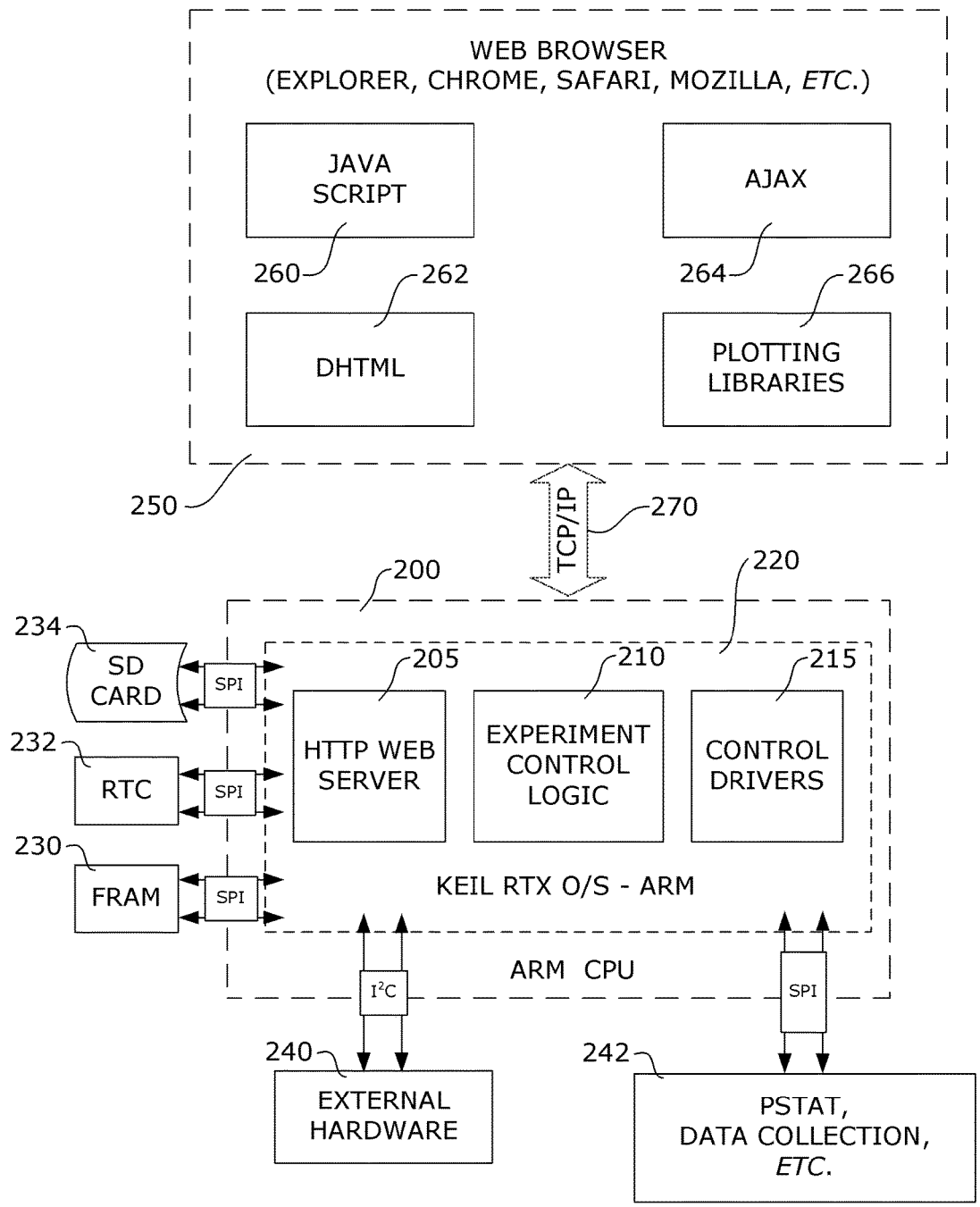
FIG. 2 is a simplified schematic representation of a specific illustrative embodiment of the invention depicting the interrelationships between a local ARM CPU and a user accessible browser system, all of which are integrated into one unit.

FIG. 2 is a simplified schematic representation of a specific illustrative embodiment of the invention depicting the interrelationships between a local ARM CPU 200 and a user accessible browser system 250, all of which are integrated in this specific illustrative embodiment of the invention into one unit. In this specific illustrative embodiment of the invention ARM CPU 200 is a commercially available reduced instruction set processor. In this embodiment, the operation of ARM CPU 200 is controlled by a real-time operating system, illustratively the Keil RTX operating system 220, which is a real-time operating system designed for ARM and other controllers. Keil RTX operating system 220 supports, in this specific illustrative embodiment of the invention, an HTTP server 205, experiment control logic 210, and control drivers 215, illustratively for one or more commercially available electrochemical analyzers (not shown), potentiostats (not shown), spectroscopy analyzers, chromatographic analyzers, etc. One commercially available electrochemical analyzer that is usable in conjunction with the present invention is the DLK-70 provided by Analytical Instruments Systems, Inc., P.O. Box 458, Flemington, N.J. 08822-0458. Keil RTX operating system 220 interfaces with ferro-electric random-access memory (FRAM) 230 (not shown), a real time clock (RTC) 232 (not shown), and a data storage system, such as a secure digital card, (SD) 234, via serial peripheral interface (SPI). In addition, Keil RTX operating system 220 interfaces with external hardware 240 via an inter integrated circuit ($I^2C$) and a plurality of sensors, such as a potentiostat and a data collection system, all of which are collectively referenced in this figure as function block 242.

Keil RTX operating system 220 supplies data to user accessible browser system 250 via TCP/IP data transfer network 270. User accessible browser system 250 supports any or all of JAVA script 260; Dynamic HyperText Markup Language DHTML 262, which is a form of HyperText Markup Language (HTML) that is created inside a browser by a scripting language, rather than sent from a server. In addition, user accessible browser system 250 supports asynchronous Javascript and XML, referred to as AJAX 264, and plotting libraries 266. In the practice of the invention, user accessible browser system 250 can be any of Internet Explorer, Google Chrome, Apple Safari, Mozilla Firefox, etc.

Figure 3:
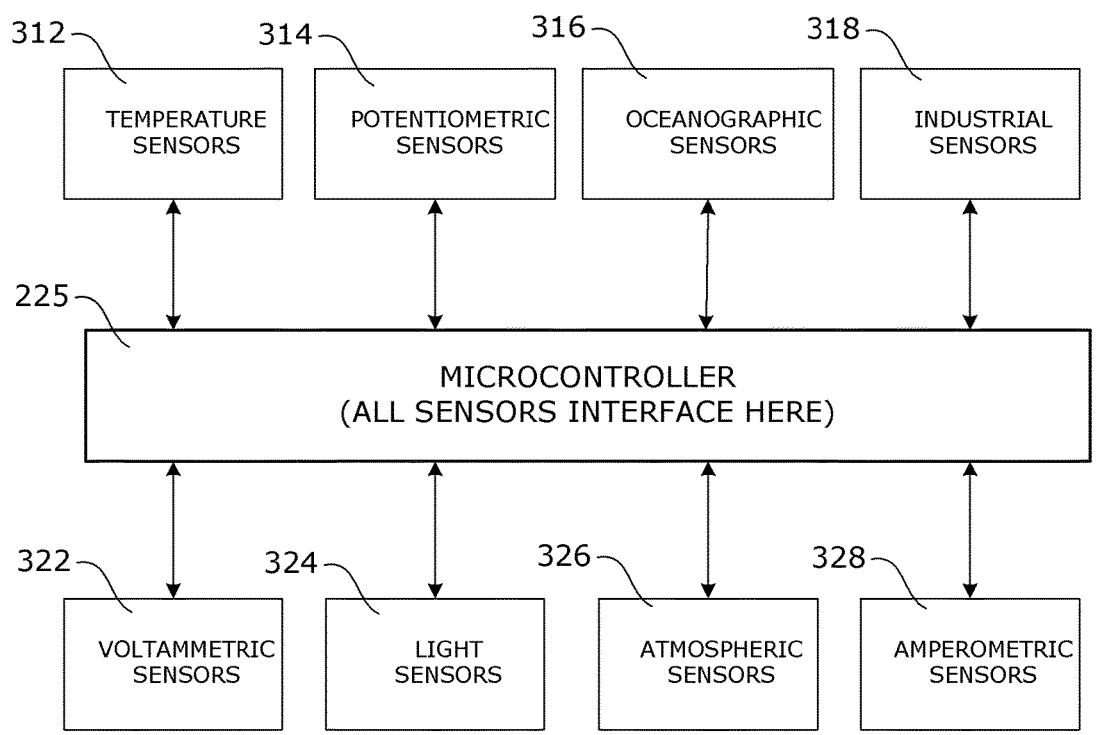
FIG. 3 is a simplified schematic representation of a specific illustrative embodiment of the invention depicting the interface of the various sensors that are useful in the practice of the invention with a microcontroller.

In the practice of a specific illustrative embodiment of the invention, the boot process for ARM CPU 200 and Keil RTX operating system 220 is as follows:
  Initialize the MAC network address from Flash storage;
  Initialize the TCP/IP Network;
  Initialize the Real Time Clock on CPU;
  Initialize I/O Registers;
  Initialize General I/O;
  Initialize $I^2C$ Channels;
  Initialize SPI Channels;
  Initialize Data Acquisition Timer (CPU Timer);
  Place PSTAT in Resting State;
  Initialize Display;
  Initialize File System;
  Start log file;
  Initialize Front Panel;
  Initialize RS-232 Command Processor;
  Initialize Secondary External RS-232 Channel (Optode, etc.);
  Create TCP/IP Task (User Interface), which includes;
    Sync Network Settings (with configuration file);
    Load User Preferences;
    Load Electrode Configuration;
    Set Multiplexer Channels;
    Initialize Sequence Management;
    Load and set DAC Calibration Settings; and
    Test FRAM;
  Create LED Blink Task;
  Start Card Removal Monitor Task;
  Start Key Reader Task; and
  Start Data Acquisition Task FIG. 3 is a simplified schematic representation of a specific illustrative embodiment of the invention depicting the interface of the various sensors that are useful in the practice of the invention with a microcontroller, such as microcontroller 225. As shown in this figure, microcontroller 225 received data from any or all of:
  temperature sensors 312;
  potentiometric sensors 314;
  oceanographic sensors 316;
  industrial sensors 318;
  voltammetric sensors 322;
  light sensors 324;
  atmospheric sensors 326; and
  amperometric sensors 328.

Of course, the practice of the invention is not limited to the use of the specific sensors herein mentioned, and persons of skill in the art will be able to configure other sensors for use with the invention. For example, the voltammetric aspect of the present invention enables the collection of data from a variety of voltammetric techniques, such as, direct current, sampled direct current, linear sweep, cyclic, normal pulse, differential pulse, and square wave voltammetric methods of analysis. Also all stripping voltammetric methods are supported in the practice of the invention.

It is a feature of the present invention that the analog electronics has, in some embodiments, been designed to allow multiple sensors to be used in one system simultaneously or in separate environments. This is a key analog electronics feature since other systems cannot work in the same environment due to cross talk among the sensors and ground loop problems which we have eliminated through relay and opto-isolation circuitry.

In addition, the present invention finds applications for homeland security, household monitoring, personnel monitoring, pharmaceutical and chemical monitoring, as well as environmental, oceanographic, and atmospheric monitoring. The invention is additionally useful in off-planet applications, including, without limitation, surface and sub-surface analysis of planets and asteroids.

Figure 4:
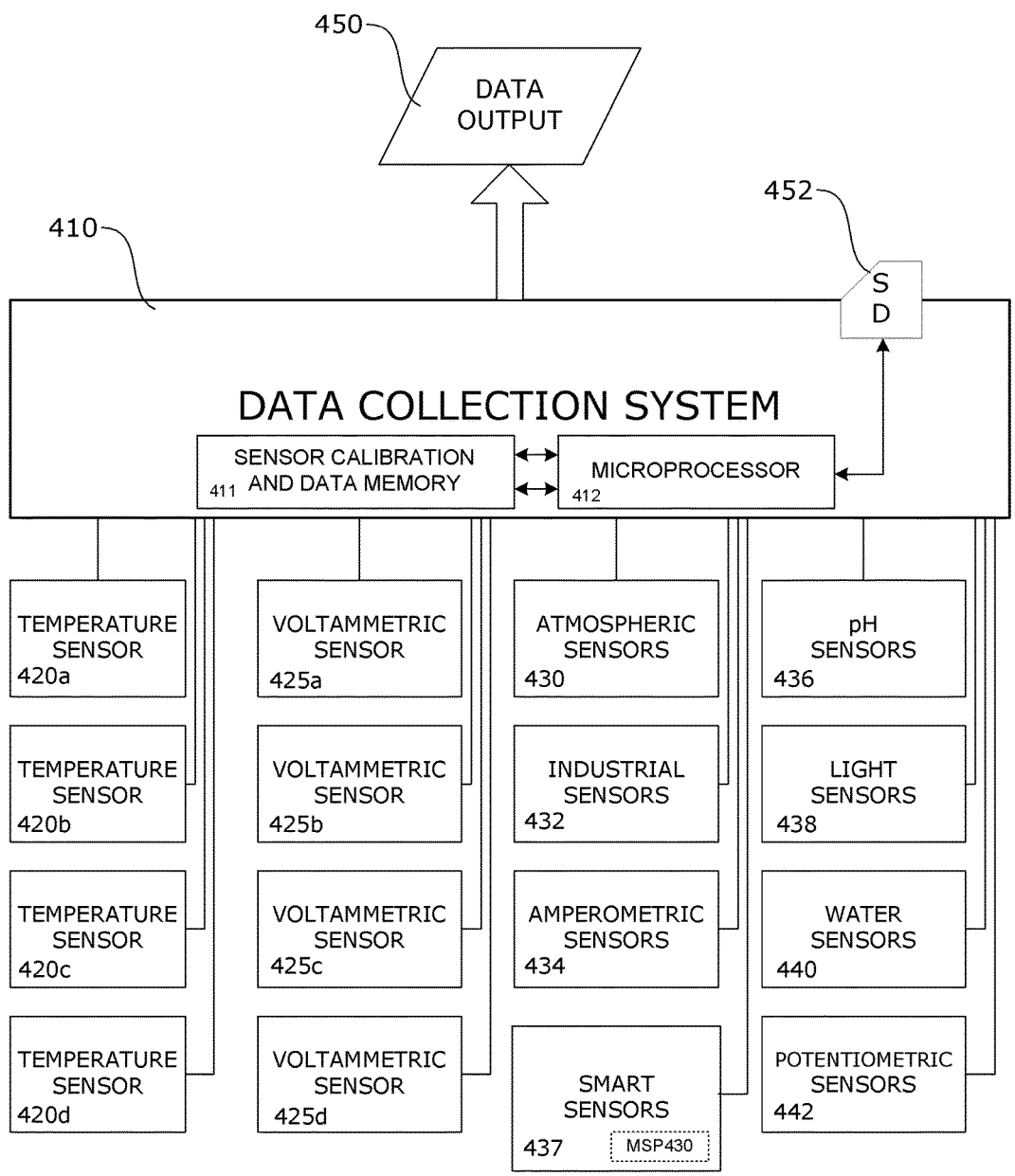
FIG. 4 is a simplified schematic representation of a specific illustrative embodiment of the invention depicting the architecture of a local network system that employs a data collection system that receives data from a plurality of sensors.

FIG. 4 is a simplified schematic representation of a specific illustrative embodiment of the invention depicting the architecture of a local network system that employs a data collection system 410 that receives data from a plurality of analog and/or digital sensors. These include, for example:
- temperature sensors 420a to 420d;
- voltammetric sensors 425a to 425d;
- atmospheric sensors 430;
- industrial sensors 432;
- amperometric sensors 434;
- pH sensors 436;
- smart sensors 437;
- light sensors 438;
- water sensors 440; and
- potentiometric sensors 332.

Again, it is to be understood that the practice of the invention is not limited to the use of the specific sensors herein mentioned, and persons of skill in the art will be able to configure other analog or digital sensors for use with the invention without exceeding the scope of the claims hereinbelow.

In this specific illustrative embodiment of the invention, there are provided in data collection system 410 an optional microprocessor 412 and a sensor calibration and data memory 411. This is particularly useful in embodiments of the invention where smart sensors, such as smart sensors 437 are utilized. Smart sensors that are useful in the practice of the invention are commercially available from Analytical Instrument Systems, Inc. of Flemington, N.J. (www.aishome.com). The data that is used to calibrate the smart sensors, as well as other sensors, is stored in sensor calibration and data memory 411. Thus, sensors can readily be moved within the environment under examination (not shown), or replaced, and the calibration data is readily provided from data collection system 410 with minimal delay. Sensor calibration and data memory 411 also retains, in some embodiments of the invention, data that is obtained corresponding to sensor readings. Additionally, sensor calibration and data memory 411 contains in some embodiments data that is used to operate instruments, and includes in some embodiments, subroutines and macros that govern the operation of the instruments. Any dumb probe, such as a temperature probe, a pH probe, etc. can be attached to the smart sensor interface of data collection system 410 and communicate therewith by SPI or $I^2C$ (not shown in this figure). As will be discussed below in relation to FIG. 5, the main instrument can store basic calibration data in the memory of the sensor probe itself, thus making it smart.

In some embodiments of the invention, microprocessor 412 is a commercially available device, such as a MSP430 style of processor that enables calibration and basic mathematical functions to be performed using sensor calibration and data memory 411.

The MSP430 processor is a Texas Instrument product is derived from a family of ultra-low-power 16-bit RISC mixed-signal processors that provide a solution for battery-powered measurement applications. Using mixed-signal and digital technologies, the MSP430 microprocessor enables simultaneous interface to analog signals, sensors, and digital components while maintaining low power requirements. Of course, persons of skill in the art can configure other commercially available microprocessors for use in the practice of the invention.

In still further embodiments of the invention, a microprocessor, such as the MSP430 microprocessor, is optionally incorporated directly into the smart sensor, as depicted in the schematic representation of smart sensors 437 of FIG. 4. This enables the smart sensors to be self-calibrating as they are relocated during use in the accumulation of experimental data. As stated, other types and brands of small microprocessors can be used in the practice of the invention. In some embodiments, calibration and basic mathematical functions are thereby performed on the sensor(s) themselves.

Continuing with FIG. 4, data is issued by data collection system 410 at an output 450. In other embodiments, the data is stored in a SD card 452, or other storage medium. Data from the system of the present invention is collected, in some embodiments, on a standard secure digital ("SD") card of any size or type including, without limitation, the standard SD card, the mini SD card, and the Micro SD card. The process of data storage in a specific illustrative embodiment of the invention is such that if the data collection is interrupted, or if there is a power interruption, all data that is received is preserved directly on the SD card itself. The SD card or other form of storage media is then removed and the collected data is readily made available at a processing computer or at a further storage system.

In the practice of the invention, data collection system 410 is an instrument that enables the researcher to collect data from a variety of sensors all simultaneously and in identical file structures. The data collection system of the present invention allows the researcher to collect voltammetric, potentiometric, and amperometric data along with other sensor data all concurrently. This functionality permits several voltammetric type sensors to be connected to the systems and data is collected from them as well as from other sensors.

The system of the present invention can be applied to a variety of environmental areas from marshes, fresh or salt water columns, ocean sediments, and hydrothermal vents. In addition, the system can be employed in industrial applications, well monitoring, as well as chemical synthesis monitoring in a laboratory or in industrial environments. Standard atmospheric monitoring sensors and associated wind speed, air temperature, humidity, etc. sensors can also be integrated into the system of the present invention.

The voltammetric component of the present system enables the collection of data from a variety of voltammetric techniques such as, DC, sample DC, linear sweep, cyclic, normal pulse, differential pulse, and square wave voltammetric methods of analysis. Also all stripping voltammetric methods are supported. It is a feature of the present invention that these techniques and their associated waveforms can be applied simultaneously to the many electrochemical cells in the environment. Moreover, the system of the present invention will enable collection of data from other sensors such as several different types of thermocouples, resistance temperature detectors, and other temperature recording devices.

Other sensors, including for example, pH probes and other potentiometric instruments and sensors can be connected to the present system thereby facilitating a complete chemical and physiochemical understanding of the environment under study. Still further sensors, such as light sensors, radiance meters, and other commercial sensors can be integrated into the system thereby enabling coordinated collection of data that could not previously be concurrently collected. In some embodiments of the invention, photographic information is collected along with all scientific data.

In some embodiments of the invention, data from the system is collected onto a removable standard Secure Digital card, such as SD card 452, which, as previously noted, can be of any size or type, including for example a standard SD card, a mini SD card, a micro SD card, a compact flash card, or any other proprietary flash memory device. Data is stored in a manner that preserves the information in the event that the data collection or the supply power is interrupted.

Figure 5:
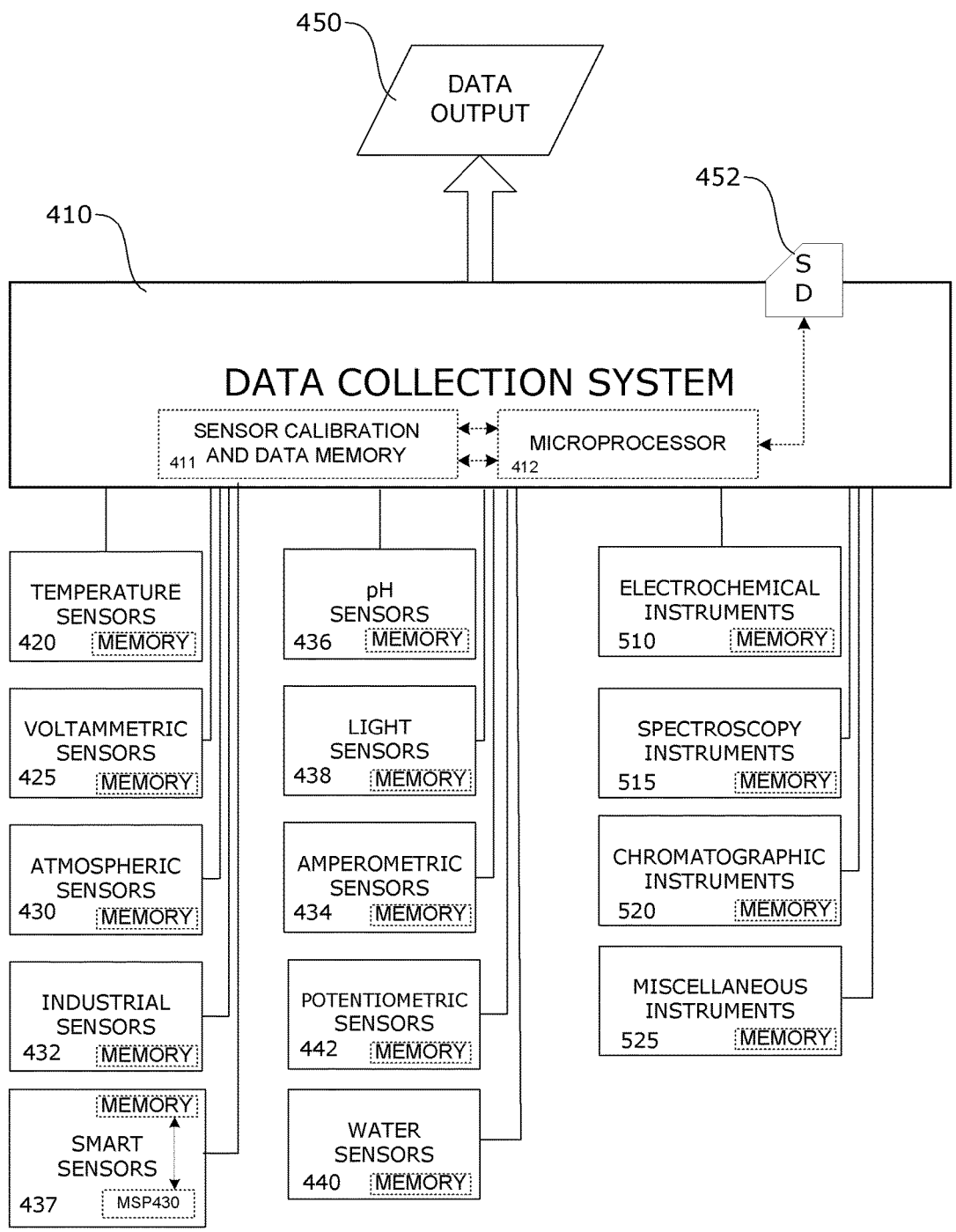
FIG. 5 is a simplified schematic representation of a specific illustrative embodiment of the invention depicting the architecture of a local network system that employs a data collection system that receives data from a plurality of instruments, such as and electrochemical instrument, spectroscopy instruments, chromatographic instruments, and other similar instruments, as well as a plurality of sensors.

FIG. 5 is a simplified schematic representation of a specific illustrative embodiment of the invention depicting the architecture of a local network system that employs a data collection system that receives data from a plurality of instruments, such as electrochemical instruments, spectroscopy instruments, chromatographic instruments, and other similar instruments, as well as a plurality of sensors. Elements of structure that have previously been discussed are similarly designated.

As shown in this figure, data collection system 410 that receives data from a plurality of sensors, such as temperature sensors 420, voltammetric sensors 425, atmospheric sensors 430, industrial sensors 432, amperometric sensors 434, pH sensors 436, light sensors 438, water sensors 440, and potentiometric sensors 332. Not all of such sensors are included in the practice of every embodiment of the invention, and of course, other types of sensors can be used in other embodiments of the invention. In this embodiment, however, there is optionally provided in some or all of the sensors a memory that stores data generated by the sensor, which data is subsequently uploaded to data collection system 410. From there, the data is made available to remote servers and other computers, as hereinabove described.

The specific illustrative embodiment of FIG. 5 additionally is provided with a plurality of instruments, such as electrochemical instruments 510, spectroscopy instruments 515, chromatographic instruments 520, and other miscellaneous instruments 525, which includes in some embodiments digital or analog oceanographic instruments. As is the case with the sensors shown in this specific illustrative embodiment of the invention, not all of the instruments herein shown are required to be used in every embodiment of the invention, and of course, other instruments not shown here can be adapted to be used in the present invention by persons of skill in the art. Moreover, the memory shown in the respective instruments is optional in the practice of the invention. In the case of smart sensors 437, the optional memory communicates with an on-sensor microprocessor, such as a Texas Instruments MSP430 microprocessor. However, in some embodiments, the MSP430 microprocessor is commercially available with on-board flash and ROM memories.

Figure 6:
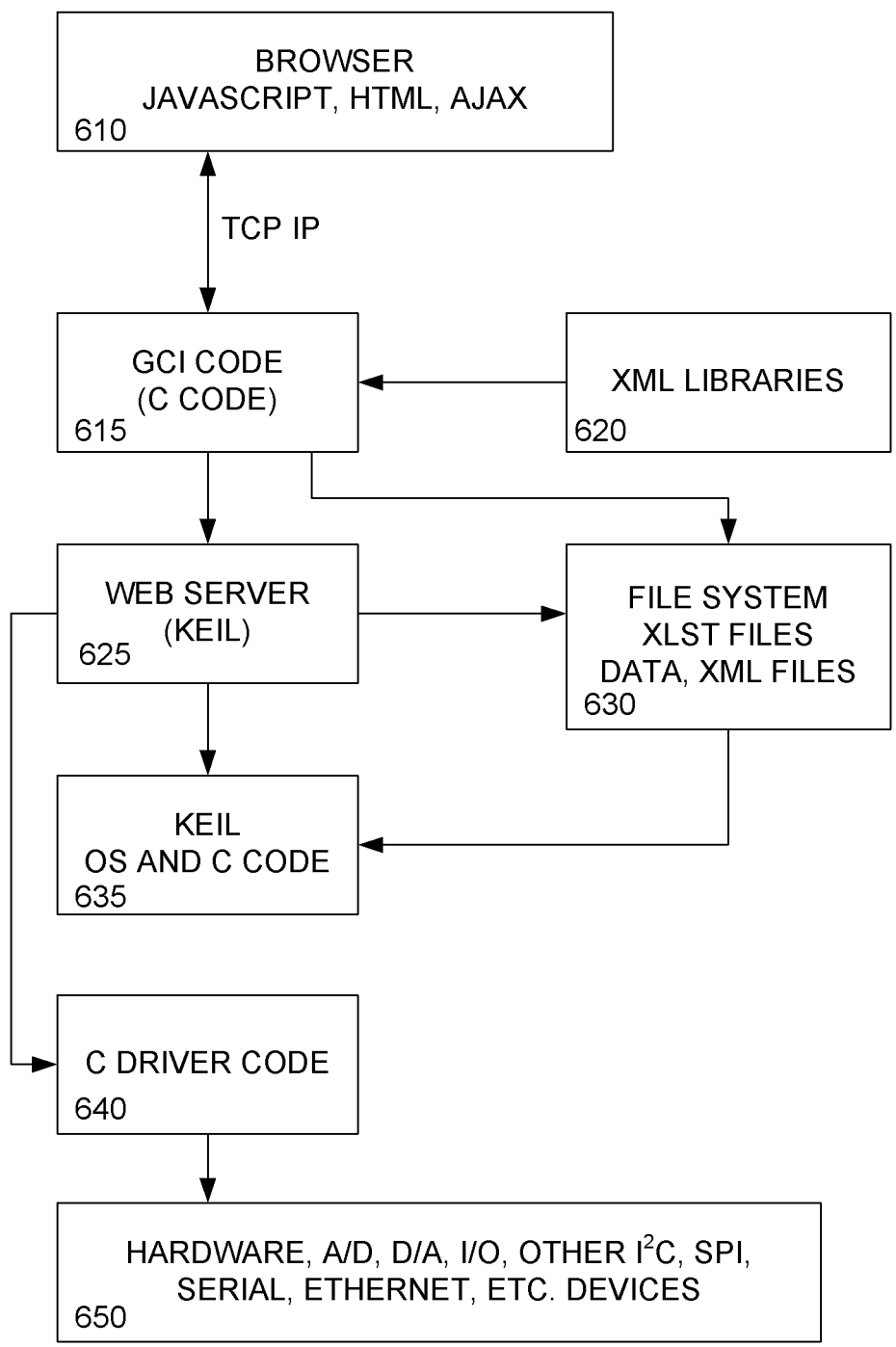
FIG. 6 is a schematic and function block representation of the computer code system used in the practice of a specific illustrative embodiment of the invention.

FIG. 6 is a schematic and function block representation of an illustrative computer code system used in the practice of a specific illustrative embodiment of the invention for controlling a plurality of sensors, instruments, and other devices, as described hereinbelow. As shown in this figure, a browser 610 receives and transmits in this embodiment over a Transmission Control Protocol—Internet Protocol (TCP IP) communication link data that is obtained from, and delivered to, hardware, analog-to-digital converters (A/D), digital-to-analog converters (D/A), input/out devices (I/O), other inter integrated circuit device ($I^2C$), serial peripheral interface devices (SPI), as well as serial, ethernet, and other devices, all of which are generally designated as devices 650. It is to be understood that not all of the stated devices and systems need to be incorporated in the practice of the invention, and persons of skill in the art can configure other devices and systems for use withing the framework of the present invention.

Browser 610 exchanges information with a generic channel interface system (GCI) 615 that in this specific illustrative embodiment of the invention employs well-known C code. GCI 615 receives library information from one or more extensible mark-up language (XML) libraries 620. GCI 615 supplies data to a web server 625, which in this embodiment of the invention utilizes the known Keil programming system, and to a file system 630 that in this embodiment includes XLST files, data, and XML files. Web server 625 and file system 630 communicate with a Keil operating system 635, which in this embodiment also contains C code. In addition, web server 625 supplies data to a C driver code system 640 that communicates with devices 650.

It is a feature of the invention that in some embodiments, the system detect faults with its sensor probe(s) and issues corresponding report(sw) to the main processor. An alarm then is activated, or a fault signal is generated, and in some embodiments, an email sent to the user.

Although the invention has been described in terms of specific embodiments and applications, persons of skill in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A system for monitoring and controlling electrical devices of the type used to measure chemical and physiochemical properties in an environment under study, the system comprising:

a local central processor having a first memory region for storing an operating system and a second memory region for storing a control system for controlling electrical devices;

a web browser system embedded in the local central processor;

a communications system that interfaces with the web browser system for conducting data between said local central processor and said web browser system, said central processor, said web browser, and said communications system being integrated into one unit:

at least one electrical device for interacting with the environment under study to produce experimental data, said at least one electrical device being coupled to said local central processor;

wherein said local central processor is further provided with a third memory region for storing control drivers for an electrochemical controller; and wherein the at least one electrical device comprises any combination of temperature sensors, potentiometric sensors, oceanographic sensors, industrial sensors, voltammetric sensors, light sensors, atmospheric sensors, water sensors, pH sensors, and amperometric sensors.

2. The system of claim 1, wherein said local central processor is an ARM processor.

3. The system of claim 2, wherein the operating system is a Keil RTX operating system.

4. The system of claim 1, wherein there is further provided an electrochemical controller coupled to said local central processor.

5. The system of claim 1, wherein said electrochemical controller is a model DLK-70 controller by Analytical Instrument Systems, Inc.

6. The system of claim 1, wherein there is further provided external hardware coupled to said local central processor.

7. The system of claim 6, wherein said external hardware is coupled to said local central processor via an inter integrated circuit interconnection system.

8. The system of claim 1, wherein at least one sensor of said plurality of sensors issues sensor data that is stored in a removable data storage arrangement.

9. The system of claim 8, wherein said removable data storage arrangement is a remote removable data storage arrangement.

10. The system of claim 1, wherein at least one sensor of said plurality of sensors is provided with a memory for storing data generated by the associated sensor.

11. The system of claim 1, wherein at least one sensor of said plurality of sensors is provided with a microprocessor.

12. The system of claim 1, wherein said at least one electrical device comprises at least one instrument coupled to said local central processor.

13. The system of claim 12, wherein said at least one instrument is provided with a memory for storing instrument data generated by said instrument.

14. The system of claim 13, wherein said memory is removable.

15. The system of claim 12, wherein said at least one instrument issues instrument data that is stored in a remote data storage arrangement.

16. The system of claim 15, wherein said remote data storage arrangement is removable.

17. The system of claim 12, wherein said at least one instrument comprises any combination of instruments selected from the group consisting of an electrochemical instrument, a spectroscopy instrument, a chromatographic instrument, an oceanographic instrument, and any other suitable instrument.

18. The system of claim 12, wherein said at least one instrument comprises a plurality of instruments.

* * * * *